March 6, 1934.  C. HANSEN  1,950,302
SAMPLE TAKING MECHANISM FOR BODY MAKERS
Filed June 2, 1932   3 Sheets-Sheet 1

INVENTOR
CHRIS HANSEN
BY
Cook + Robinson
ATTORNEY

March 6, 1934.   C. HANSEN   1,950,302
SAMPLE TAKING MECHANISM FOR BODY MAKERS
Filed June 2, 1932   3 Sheets-Sheet 2

INVENTOR
CHRIS HANSEN
BY
Cook & Robinson
ATTORNEY

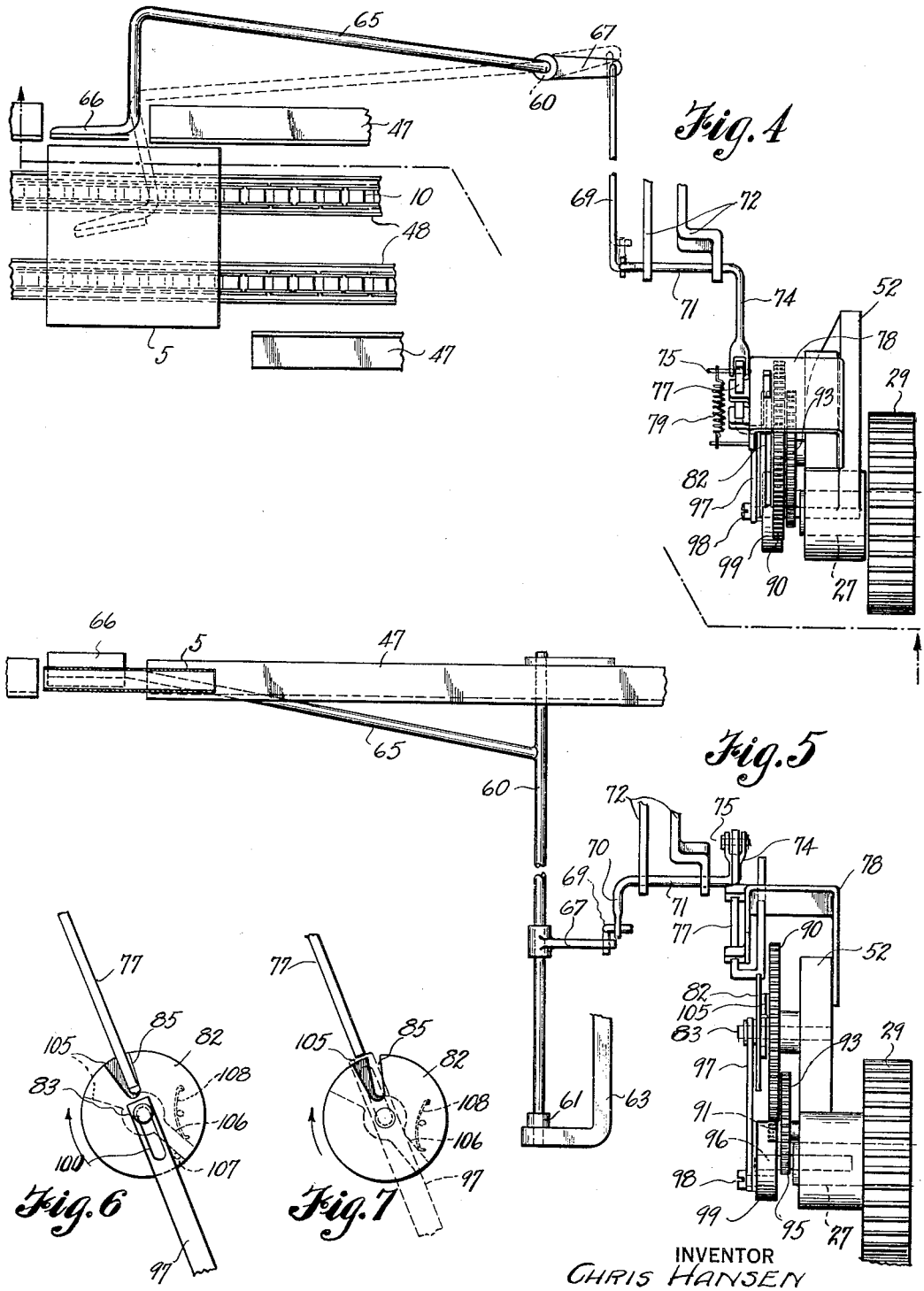

Patented Mar. 6, 1934

1,950,302

UNITED STATES PATENT OFFICE 1,950,302

SAMPLE TAKING MECHANISM FOR BODY MAKERS

Chris Hansen, Seattle, Wash., assignor to Continental Can Company, Inc., New York, N. Y., a corporation Application June 2, 1932, Serial No. 615,014

6 Claims. (Cl. 198—24)

This invention relates to improvements in a mechanism for removing sample articles from a traveling series thereof and more particularly to an automatically operating mechanism for taking cans, for the purpose of testing, from a traveling line of cans at timed intervals. The term "cans" as used herein and throughout the description, defines a completed can body before the ends are attached thereto or a can body having an end attached thereto.

In the present day high speed manufacture of cans, and especially those in which products are to be hermetically sealed, it is extremely desirable to make frequent tests of can bodies as delivered from the body maker to ascertain whether or not the machine is functioning properly, especially with reference to the formation of the side seam. Also, to ascertain if there are any other defects in the body that would impair its usefulness or permit spoilage of a product later packed therein.

Applicant is aware of various automatic samplers which operate at timed intervals to take samples from a flowing product, but he is not aware of any such mechanism being applied to can body formers, or similar machines for removing can bodies from a moving line for purpose of testing. Therefore, it has been the principal object of this invention to provide a mechanism for that purpose which is operated by and in synchronism with the body former; which is relatively simple and of inexpensive construction, and which operates to periodically eject a can body from the traveling line, for testing.

More specifically stated, the present invention resides in the provision of a sample taking mechanism of the above character in connection with a high speed, can body maker whereby flat body blanks are first notched and flanged at their ends, then formed about a horn and their ends joined in a lock or lap seam, then delivered by a traveling conveyer across a solder pot and roll which applies solder to the seam, and finally across a cooler for cooling the soldered seam the sample taking mechanism consisting of certain driven gears that are synchronized with the conveyer and which have a definite ratio of teeth, whereby a control disk is rotated and timed to actuated an arm through a system of rods and levers thereby to cause the arm, at certain timed intervals, to knock a can body for testing from the conveyer.

Other objects of the invention reside in the various details of construction and in the combination of parts and mode of operation, as will hereinafter be fully described.

In accomplishing these and other objects of the invention, I have provided the improved details of construction, the preferred forms of which are illustrated in the accompanying drawings, wherein—

Fig. 4 is a plan view of the same.

Fig. 5 is a side elevation of the mechanism.

Fig. 6 is a detail of the ejector operating disk.

Fig. 7 is a similar view illustrating the action of the yielding segment carried by the disk.

The present mechanism has been devised for use in connection with a machine which forms can bodies at a rate of approximately three hundred twenty five per minute, and it operates to eject every fifty fourth can from the conveyer whereby the formed bodies are delivered along the cooler guideway.

These ejected can bodies are subsequently flanged, an end double seamed thereto and then hand tested for leaks. In the event a leak is found, the cause therefor is determined and if it should be from faulty operation of the machine, a correcting adjustment is made.

Referring more in detail to the drawings—

Figure 1:
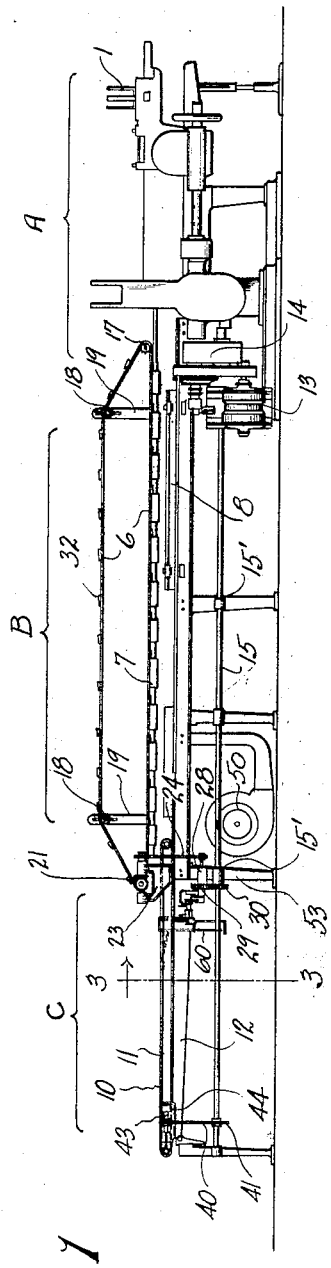
Fig. 1 is a side elevation of a can body forming machine, to which a sample taking mechanism has been applied in accordance with the present invention.
Figure 2:
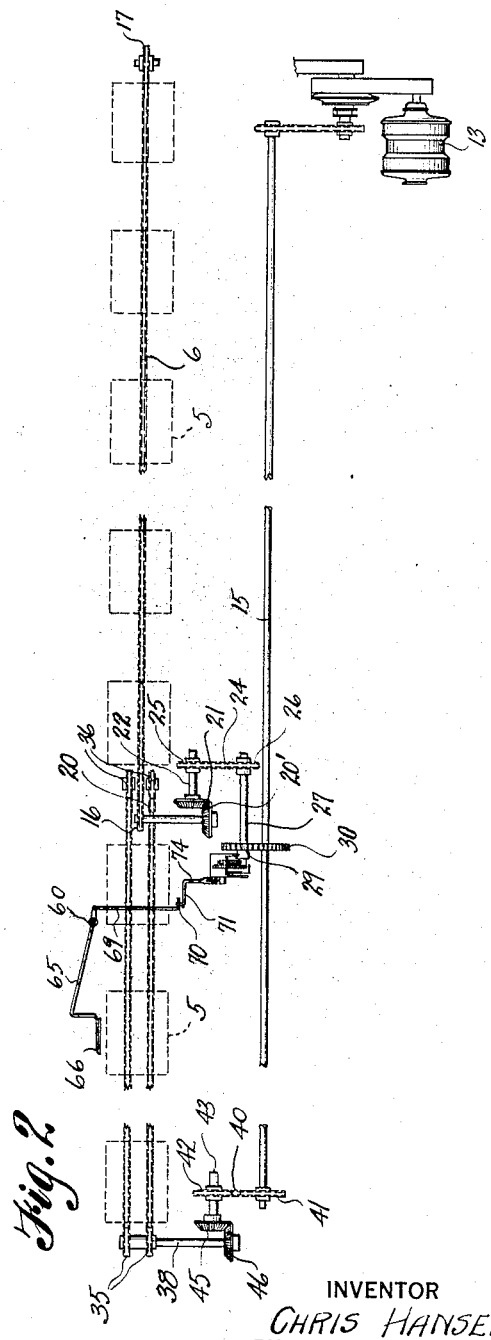
Fig. 2 is a diagrammatic illustration of the driving mechanism for conveyer systems of the body maker.

In Fig. 1 is shown a can body forming machine of the type with which the present mechanism may readily be applied. However, it is to be understood that use of the present sample taking mechanism is not confined to any special type of machine but requires only that the cans in the moving line be spaced with some degree of uniformity on the conveyer and that provision be made also to synchronize the ejector with the conveyer.

Briefly described, the body maker, designated in its entirety by reference character A, includes a hopper 1, in which the blanks from which the can bodies are to be formed, are stacked. Feed devices, not illustrated, operate to deliver the blanks one at a time and in regular timing into the body maker, and they are advanced therein past notching dies, and flangers whereby the edges of the blanks are notched and hooked. Finally the edged blanks are located across a forming horn and devices bend them about the horn and cause the ends to be hooked together and bumped, thereby to join them in a permanent seam.

The can bodies 5, thus formed are successively taken up by a conveyer chain belt 6, and are advanced in spaced relation through the side seam soldering mechanism B, along a horn 7 and across a solder pot 8 in which a solder roll revolves to apply solder to the side seam of the bodies as they pass therealong. When discharged from the horn 7 the cans are taken up by a pair of conveyer chains 10 and are delivered thereby along a guideway 11 over a cooler tube 12 from which cool air is blown against the bodies to cool the soldered seam.

The various operating devices of the body maker A and the side seam soldering mechanism B, including the conveyer chain belt 6 and the cooler conveyer chains 10, have a common source of power which is an electric motor 13. This motor, through a suitable transmission gearing designated at 14, drives the body maker and also drives a line shaft 15 that extends along the side frame structure of the soldering mechanism; this shaft being revoluble in bearings, as at 15' attached to the supporting frames of the machine.

The conveyer chain belt 6 extends about sprocket wheels 16 and 17 at opposite ends of the horn 7, and the top run of the belt is supported intermediate its ends by idler sprockets 18 adjustably supported by posts 19. The sprocket wheel 16 is mounted on a transverse shaft 20 and this is driven by a geared connection with the line shaft 15; the connection shown consisting of a beveled gear 20' keyed on the end of shaft 20 and meshing with a beveled gear 21 on a driven shaft 22 carried by a mounting bracket 23 secured to a supporting frame of the side seam soldering mechanism. The shaft 22, in turn, is driven by a chain belt 24 which operates about a sprocket wheel 25 on the shaft 22 and about a sprocket wheel 26 on a driven shaft 27. The shaft 27 is parallel with shaft 15 and is mounted in a support 28 fixed to the machine frame and is driven through the medium of intermeshing gears 29 and 30 fixed to the shafts 27 and 15 respectively.

The can conveyer belt 6 has attachment links 32 in the form of pushers fixed thereto at regularly spaced intervals and these take up the can bodies 5 delivered from the forming horn of the body maker and push them in spaced relation along the horn 7 and across the solder roll and finally discharge them into the guideway 11 for delivery by the conveyer 10 along the cooler tube.

The chains 10 operate about paired sprocket wheels 35 and 36 at opposite ends of the guideway 11. The sprocket wheels 35 are mounted on a transverse shaft 38 and this is driven by connection with shaft 15. The connection shown consists of a sprocket chain belt 40 operating about a sprocket wheel 41 on the shaft 15 and a sprocket wheel 42 on a shaft 43 revolubly mounted in a support 44 and provided at one end with a beveled gear wheel 45 meshing with and driving a beveled gear wheel 46 on the cross shaft 38.

The various driving connections above described provide that the can bodies 5 shall be moved in regular spacing along the horn 7 and delivered onto the conveyer chains 10, and that the latter shall operate to deliver the cans along the guideway 11 in spaced relation.

The cooler C in this instance consists of the tube 12 continuing from the end of the horn 7 and serving as a support for the guideway 11, which is formed by two spaced, parallel angle bars 47—47 as side members and parallel base bars 48—48 in which the conveyer chains 10—10 are slidably contained. The cooler tube is connected at one end with a blower 50 which delivers air thereinto, and it is slotted along its top wall for the discharge of a stream of air against the can bodies moving along the guideway to cool the soldered seams.

The sample taking mechanism embodied by this invention is actuated by a direct connection with the revolubly driven shaft 27 and it is mounted on a support in the form of a block 52 that is attached to a frame member 53 at the end of the side seam soldering mechanism.

Figure 3:
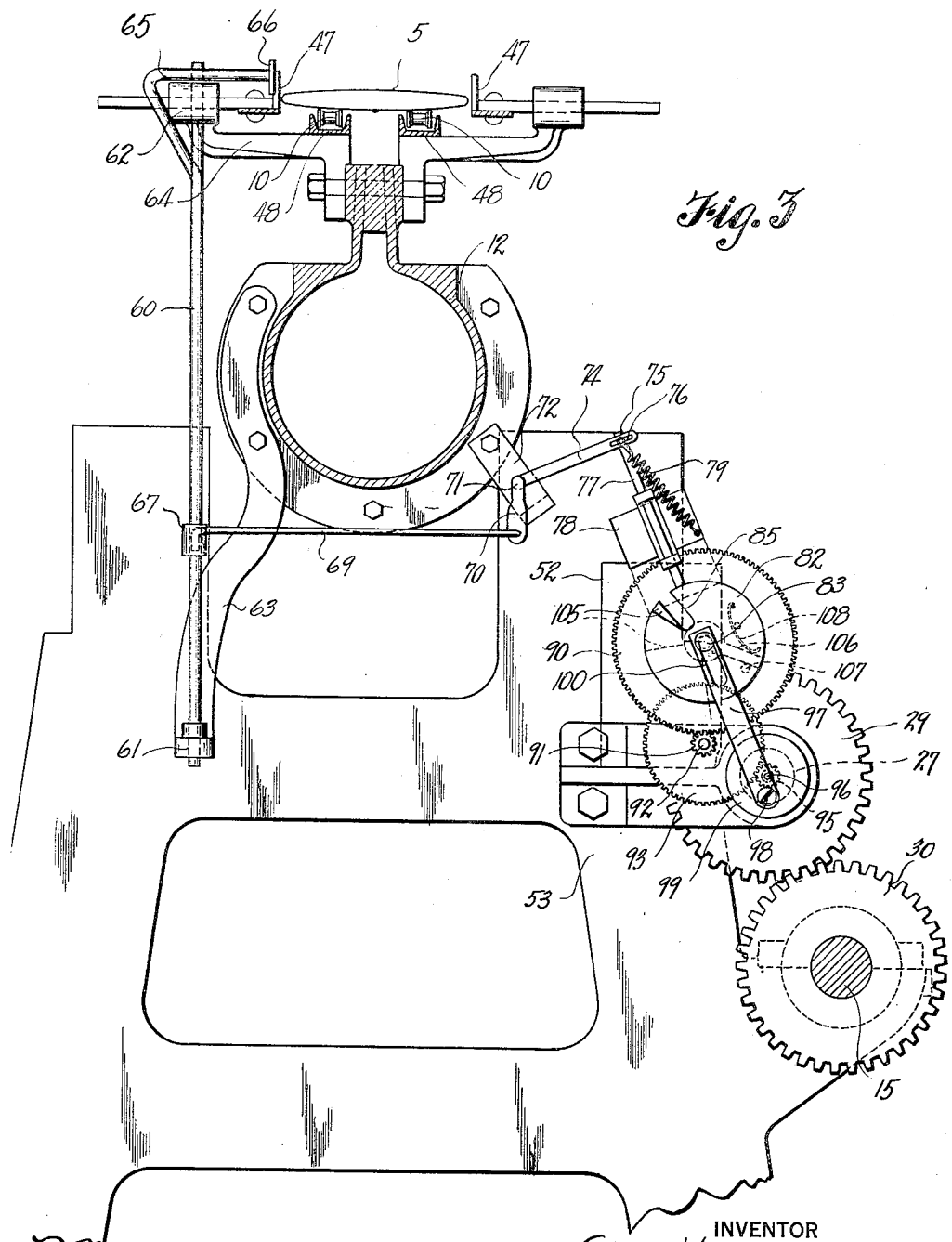
Fig. 3 is an enlarged cross section, taken on line 3—3 in Fig. 1 showing the sample taking mechanism.

As observed best by reference to Figs. 3 and 4, the can body ejecting means consists of a shaft 60 supported vertically at one side of the guideway in bearings 61 and 62. The bearing 61 receives the lower end of the shaft and is formed at the lower end of a bracket 63 rigidly attached to the cooler tube. The bearing 62 receives the upper end of the shaft and it is formed at one end of a bracket 64 extending laterally from the guideway 11. Fixed to the upper end of the shaft is a horizontally directed angulalr arm 65 and this has a shoe 66 at its end normally disposed along side of the guideway 11, and in a position whereby, when the shaft 60 is rotatably actuated, the arm will be swung into the line of travel of the cans in the guideway to knock a can therefrom. This swinging action of the arm is indicated in Fig. 4 and it will be observed that the side rails of the guideway are cut away for entrance of the arm and for the ejection of the can at the other side.

The vertical shaft 60 is actuated by a crank arm 67 fixed thereto below the level of the cooler tube and extending in the direction thereof. This arm has a link 69 attached thereto at its outer end, and the other end of the link is connected with a downwardly directed arm 70 at one end of a crank shaft 71 rotatably mounted in a bracket 72 fixed to the block 52. At its end opposite the arm 70, the crank shaft has an operating arm 74. This has a pin and slot connection 75—76 with the outer end of one leg of a U-shaped slide 77 that is mounted in a bracket 78 attached to block 52. A coiled spring 79, attached at its opposite ends to the pin 75 and to the bracket 78, operates when the slide is released to pull the slide inwardly to its inner limit of travel, thereby through the link and lever connection with shaft 60, to rotate the latter to swing the arm 65 inwardly to the dotted line position of Fig. 4 to knock a can from the traveling line of cans on the conveyer chains 10.

Normally, the slide 77 is held at its outer position of movement and the ejector arm held clear of the traveling line of cans; the means for holding the slide in this outwardly adjusted position against the tension of spring 79 consisting of a disk 82 mounted rotatably on a stub shaft 83 extending from the face of block 52. As seen in Fig. 3, the slide is disposed radially of the disk and at its lower end it rests upon the periphery of the disk, and the disk is provided at one point with a radial slot 85 opening to the edge thereof and into which the lower end of the slide will be actuated by spring 79 when the slot is brought into alinement therewith incident to rotation of the disk, thus to actuate the ejector arm.

The means provided for rotating the disk 82 to permit a periodic operation of the sample taking mechanism, consists of a relatively large gear wheel 90 that is fixed concentrically of the disk at the inner face thereof. This large gear is rotated by a smaller gear wheel 91 that meshes therewith; the gear 91 being rotatably mounted on a supporting shaft 92 and has a larger gear wheel 93 fixed concentrically thereto. Gear 93, in turn, meshes with a small driving pinion 95 fixed by a set screw not shown to the drive shaft 96.

In the present arrangement, gear 90 has one hundred eight teeth. Gear 91 has twelve teeth. Gear 93 has seventy two teeth and pinion 95 has twelve teeth. Thus, through this connection, the disk rotates once for every fifty fourth rotation of the shaft 15, and shaft 15, incidentally, rotates once for every can delivered from the body machine along the conveyer guideway. Therefore, the present device will operate to effect the ejection of every fifty fourth can delivered along the guideway.

When the slide 77, under the pull of spring 79 drops from the periphery of the disk into the slot 85 it actuates the ejector arm into the traveling line of cans and knocks one from the line. It is then required that it be moved out of the line quickly in order to let the following cans pass along the guideway without interference by the arm.

The means provided for returning the parts to normal position consists of a reciprocating pitman 97 that has one end pivotally fixed by a pivot 98 eccentrically to a crank disk 99 attached to shaft 27 by set screw 96 and at its other end is longitudinally slotted, as at 100 to receive the shaft end concentric of the disk 82. The arrangement is such that, as the shaft 27 revolves, the pitman is reciprocally actuated across the outer face of disk 82. This pitman also is alined with the slide 77 and when it is extended, its outer end will pass just beyond the periphery of disk 82. Therefore, it will be apparent that when the slide drops into the slot 85, the pitman on its next outward movement will engage the inner end of the slide and move it back to starting position and seat it again on the periphery of the rotating disk.

By reason of the fact that the disk 82 is continuously rotating, and the slide 77 has a straight line movement, the slot 85 must necessarily be tapered to prevent binding against the slide while the latter is moving into and from the slot. However, it is desired to insure that when the reciprocating pitman 97 returns the slide outwardly, the latter will be positively retained against a return movement with the pitman. Therefore, I have made the slot 85 of V-shape to give ample clearance, and have mounted a disk segment 105 on the back of disk 82 in position to partially overlap the slot. This segment has an arm 106 that engages a stop 107 on disk 82 to limit the overlap to that extent shown in Fig. 3, providing a passage corresponding in width to that of the slide that enters it. Rotation of the disk after entrance of the slide into slot 85 causes the segment to yield against the holding pressure of a leaf spring 108 mounted on the back of the disk and pressing against the arm 106. Then, when the pitman 97 on outward movement displaces the slide from the slot, the segment 105 snaps beneath its end and it cannot again enter the slot until the disk has made another complete revolution.

Thus it will be apparent that the present device operates in synchronism with the can conveyer mechanism, to eject can bodies at predetermined intervals for testing. This operation of the sample taking mechanism may be made to operate at more frequent or less frequent intervals dependent on the manner of connecting it with the drive shaft.

It is not intended that the sampler shall be confined in its use to any special type or make of body machine, but that it shall be applicable to various machines in which it may be desired to remove cans at certain intervals of time for testing or for inspection.

Having thus described my invention, what I claim as new therein and desire to secure by Letters Patent is—

1. In a can making machine the combination with a conveyer whereby cans are delivered from the machine in a traveling line, of a sample taking mechanism comprising a movably mounted ejector arm, a timing disk having a slot opening to the periphery thereof, means for rotating the disk in synchronism with movement of the conveyer, a slide operatively connected with the arm for actuating the latter into and from the traveling line for the ejection of a can therefrom for testing and bearing against the said disk and adapted incident to rotation of the disk to periodically enter the said slot, thereby to actuate the arm, a spring acting on the slide to move it into the slot, and means for restoring the slide and arm to initial position after each can ejecting operation.

2. In a can making machine, the combination with a conveyer whereby cans are moved in a traveling line, of a sample taking mechanism comprising a movably mounted ejector arm, a timing disk having a slot opening to the periphery thereof, means for rotating the disk in synchronism with the conveyer movement, a slide operatively connected with the arm for actuating it into and from the line of cans for the ejection of a can from the conveyer for testing; said slide bearing at one end against the periphery of the disk and adapted to periodically enter the slot incident to rotation of the disk, a spring acting on the slide to actuate it into the slot for moving the said arm into the line of cans, and a pitman reciprocating in synchronism with the disk and operable against the slide for restoring it to initial position after each actuation of the arm.

3. In a can making machine, the combination with a conveyer whereby cans are moved in a traveling line, of a sample taking mechanism comprising a movably mounted ejector arm, a timing disk having a radial slot opening to the periphery thereof, means for rotating the disk in synchronism with the conveyer movement, a slide radially alined with the disk and resting at one end on the periphery thereof, means operatively connecting the slide and arm for actuating the latter into and from the line of a can for the ejection of cans from the conveyer for testing; said slide being arranged to enter said radial slot when they are in alinement thereby to actuate the arm, a coiled spring acting on the slide to actuate it into the slot, and a reciprocating pitman alined with the slide and adapted to engage therewith to restore the slide and arm to initial position after each ejecting operation of the arm.

4. In a can making machine, the combination with a conveyer whereby cans are moved in a traveling line and a rotatably driven shaft operatively connected with the said conveyer for driving the latter, of a sample taking mechanism comprising a swingingly mounted arm movable into and from the traveling line for the ejection of a can therefrom for testing, a timing disk for the arm, provided with a radial slot, opening to the periphery thereof, gearing connecting the disk and shaft for rotating the disk, a slide radially alined with the disk and resting at one end against the periphery thereof, means operatively connecting the slide and arm for actuating the latter; said slide being adapted to enter said disk slot when they are brought into alinement incident to rotation of the disk thereby to actuate the arm for the ejection of a can from the traveling line, a spring attached to the slide under tension to actuate the slide into the disk slot, a pitman and means operated from said driven shaft for moving said pitman into engagement with said slide for moving said slide out of the slot to initial position in engagement with said disk.

5. A device as recited in claim 4 wherein the slot of the disk is wider than the slide to prevent binding incident to rotation of the disk while the slide is within the slot, and a latch segment is yieldingly mounted on the disk, partially overlapping the slot to engage with the slide after it enters the slot and to yield as the disk rotates and adapted when the slide is returned outwardly by the pitman to snap beneath the end thereof to support it against return into the slot when the pitman retracts.

6. In a can making machine, the combination with a conveyer whereby cans are moved in a traveling line and a rotatably driven shaft operatively connected with the said conveyer for driving the latter, of a sample taking mechanism comprising a swingingly mounted arm movable into and from the traveling line for the ejection of a can therefrom for testing, a counter shaft, a disk fixed coaxially thereon, gearing connecting the counter shaft and driven shaft for rotating the disk; said disk having a radial slot opening to the edge thereof, a slide operatively connected with the arm and resting at one end on said disk and adapted to enter the slot for actuation of the arm, a spring attached to the slide and operable to actuate the slide into the disk slot when they are brought into alinement by rotation of the disk, an actuating shaft operated by said driven shaft, a crank disk on said actuating shaft, a pitman pivoted thereto with its opposite end reciprocally operable across the disk to engage said slide to move it outwardly from the slot; said slot being wider than the slide to prevent binding and a latch segment pivotally overlapping the slot to engage with the slide after it enters the slot and to yield as the disk rotates and adapted, when the slide is returned outwardly by the pitman, to snap beneath the end thereof to support it against return into the slot when the pitman retracts.

CHRIS HANSEN.